No. 651,680. Patented June 12, 1900.
H. B. WARE & C. C. CORNELL.
ELECTRIC BATTERY ATTACHMENT.
(Application filed Nov. 23, 1899.)

(No Model.)

WITNESSES:
H. Walker
C. R. Ferguson

INVENTORS
H. B. Ware
C. C. Cornell
BY
ATTORNEYS

UNITED STATES PATENT OFFICE.

HENRY BOWLES WARE AND CHAUNCEY CORTEZ CORNELL, OF WYMORE, NEBRASKA.

ELECTRIC-BATTERY ATTACHMENT.

SPECIFICATION forming part of Letters Patent No. 651,680, dated June 12, 1900.

Application filed November 23, 1899. Serial No. 738,041. (No model.)

*To all whom it may concern:*

Be it known that we, HENRY BOWLES WARE and CHAUNCEY CORTEZ CORNELL, citizens of the United States, and residents of Wymore, in the county of Gage and State of Nebraska, have invented a new and Improved Electric-Battery Attachment, of which the following is a full, clear, and exact description.

This invention relates to attachments for electric batteries of the gravity type; and the object is to provide a simple device to be placed between the elements of the battery to catch any particles that may fall from the upper or zinc element, thus insuring its complete consumption and preventing waste, and further preventing to a large extent the copper element from becoming oxidized, thereby maintaining an internal equal resistance of the battery and also maintaining a uniform electromotive force throughout the battery.

We will describe a battery attachment embodying our invention, and then point out the novel features in the appended claims.

Reference is to be had to the accompanying drawings, forming a part of this specification, in which similar characters of reference indicate corresponding parts in both views.

Figure 1:
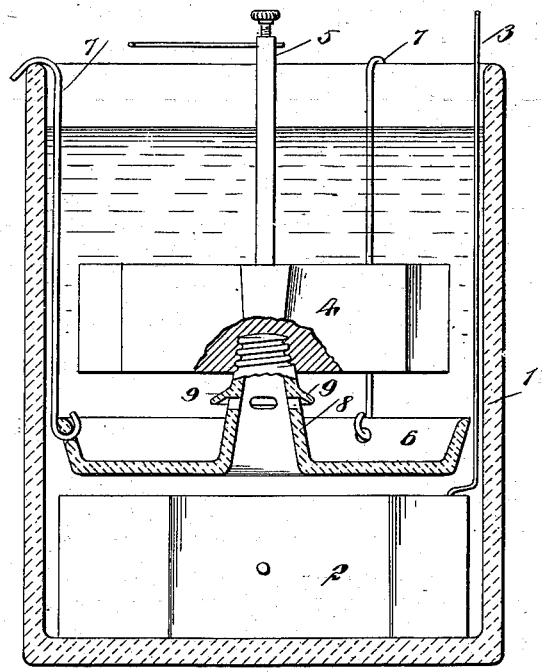
Figure 2:
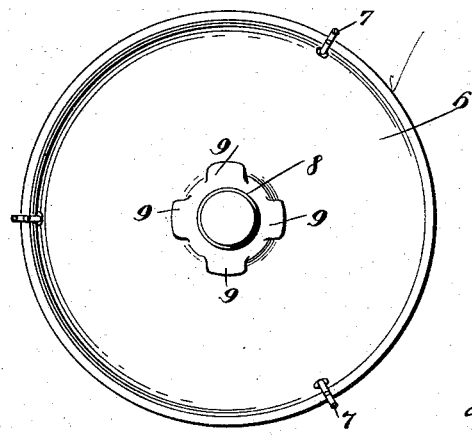

Figure 1 is a sectional elevation of a battery, showing our improvement as applied thereto; and Fig. 2 is a plan view of the attachment.

Referring to the drawings, 1 designates the battery-jar, 2 the copper element, having a terminal 3, and 4 the zinc element, having a terminal stem 5. Supported between the elements is a tray 6, consisting of insulating material—such, for instance, as porcelain or other fictile material. This tray is suspended from the top of the jar 1 by means of hangers 7, and its diameter is somewhat less than the interior diameter of the jar, so that liquid may pass freely between the tray and the wall of the jar. At its central portion the tray has an upward tubular extension 8, provided with perforations through which liquid may pass. This upward extension projects above the peripheral wall of the tray, and it has a screw-thread for engaging in a threaded socket in the element 4, and thus the zinc element is supported. Ledges 9 over the openings in the part 8 will prevent particles of zinc from falling through onto the copper element. The tray will catch any particles of zinc that may become detached from the zinc element during the action of the battery, and these detached particles will also become wholly consumed. Therefore it is obvious that the life of the battery will not only be prolonged, but the copper element will be protected from any particles of zinc, thus preventing oxidation of said copper element.

Having thus described our invention, we claim as new and desire to secure by Letters Patent—

1. In an electric battery, a tray of insulating material supported between the elements of the battery, the said tray having a central upward projection engaging and supporting the upper element said projection being hollow and perforated, substantially as specified.

2. In an electric battery, a tray of insulating material supported between the elements of the battery and having a hollow central upward projection provided with perforations, substantially as specified.

3. In an electric battery, a tray of porcelain or the like, supported between the battery elements, and having a hollow central perforated upward projection extended above the peripheral wall of the tray and having a screw-thread engaging the upper element, substantially as specified.

HENRY BOWLES WARE.
CHAUNCEY CORTEZ CORNELL.

Witnesses:
J. E. CAMERON,
J. A. McGUIRE.